United States Patent [19]

Bononi

[11] 4,390,256
[45] Jun. 28, 1983

[54] PAD OF HIGH ELASTICITY

[76] Inventor: Walter Bononi, Zeppelinstrasse 9, 7012 Fellbach-Schmiden, Fed. Rep. of Germany

[21] Appl. No.: 243,795

[22] Filed: Mar. 16, 1981

[30] Foreign Application Priority Data

Mar. 20, 1980 [DE] Fed. Rep. of Germany ....... 3010735

[51] Int. Cl.$^3$ .......................... G03B 3/00; G03B 29/00; G03B 19/18
[52] U.S. Cl. ................................... 351/139; 351/132; 351/136
[58] Field of Search ............... 351/136, 137, 138, 139, 351/131, 132, 87, 88, 69, 76, 77, 78, 79, 80, 81, 82; 2/446

[56] References Cited

FOREIGN PATENT DOCUMENTS 1168361 12/1958 France .............................. 351/156

Primary Examiner—John K. Corbin
Assistant Examiner—Rodney Bovernick

[57] ABSTRACT

A pad for eyeglass frames has a kidney-shaped outer edge contour, a soft, pliant front side for contacting the wearer and stable means on the back for receiving the frame pad lever. Thin flexible members radiate from the pad lever receiving means to the kidney-shaped contour edge. A foil-like membrane form-connects with the kidney-shaped outer edge contour. The membrane has a convex surface according to the shape of the front side of the pad.

8 Claims, 7 Drawing Figures

PAD OF HIGH ELASTICITY

BACKGROUND OF THE INVENTION

The invention concerns a pad of high elasticity, whose outer edge is kidney-shaped, which has a front and a back and whose back has a stable receiver box for a pad lever and whose front is soft and pliant.

Many people have a flat nose, as do, for example, all children and Orientals. Physically, the sides and the bridge of the nose form parts of a wedge-shaped surface. According to the principles of a wedge, contact pressure multiplies as the angle is reduced. This pressure is also determined by the static as well as the dynamic weight of the eyeglasses. Static weight is produced by the weight of the eyeglass frame, the weight of the lenses, etc. Dynamic weight may be produced by air turbulence, by impact during sports and play, etc.

All of these forces must be braced by adequately esthetic pads on the skin of the nose. Esthetic because the eye area is so instrumetal in determining the identity of a person that in an otherwise excellent photograph, one need only cover up the eye area to make the individual anonymous. Proper introduction of these forces is important because the skin of the nose is thin, since the nasal bones, even in otherwise corpulent people, are situated immediately beneath it. In addition, both the nose and the skin of the nose are naturally sensitive.

These factors have led to recent efforts in using pads of certain silicon rubber of a Shore-D hardness heretofore not known in this country.

Such a pad is most effective when the surface pressure at all contact points with the skin is equal. Otherwise, pressure will be concentrated, such as by a tire which is overinflated on the inner areas, or in the case of a tire which is not sufficiently inflated on the outer areas.

OBJECT AND STATEMENT OF THE INVENTION

The object of the invention is to provide a pad which permits the forces to be introduced from the pad lever to the front of the pad in such a way that the surface pressure is greatly equalized. At the same time the pad must be esthetic in appearance; it should not require a larger than usual area and the construction should be compatible in practice, i.e. it should lend itself to mass-manufacturing; it should be light in weight; it should not force the designer into major changes; a layman should be able to clean it; it should function in artic temperatures as well as in hot-humid tropical climates, etc.

The invention solves these tasks by the following characteristics:

Thin, flexible members radiate integrally from the stable pad lever receiving means, and have outer ends terminating at the kidney-shaped outer edge portion.

A foil-like membrane has an outer edge portion and a convex surface according to the shape of the front contact side of the pad.

The kidney-shaped outer edge portion has an outer area to receive the membrane and the membrane has a curved surface at its outer edge portion which engages with the outer area on the kidney-shaped outer edge portion.

The invention has the following additional advantageous features:

The radiating members divide the pad into sections. As a result, both an esthetically even distribution of the radiating members and a favorable introduction of the forces to the edge are obtained.

The outer ends of the radiating members have nerve-end-like enlargements. As a result, the injection-molded manufacturing process is improved, risk of breakage at the ends is reduced and a pleasing shape is obtained.

The radiating members meet the receiving means at approximately the surface center of gravity of the pad. As a result, practically only true rather than fictitious forces (consistent with the triangle of forces) act on the radiating members.

The engagement of the outer area of the kidney-shaped outer edge portion and the membrane outer edge portion is a snap-on connection. As a result, it is easy to connect the two parts, and if an adhesive is additionally used, the connection is equal to being monolithic.

The radiating members and the kidney-shaped outer edge portion are molded of soft synthetic material and the surface of the soft synthetic material is molded to the contour of the membrane. As a result, it is possible to even further reduce hardness without problems arising in the attachment of the pad to the pad lever.

The radiating members, the kidney-shaped outer edge and the membrane consist of colorless material. As a result, the overall construction gives the optical appearance of being one piece.

The soft synthetic material has a Shore-D hardness, measured by DIN 53505, in the range of 5 to 15.

The membrane is a textile cover.

DESCRIPTION OF THE DRAWING

Based on the drawings, preferred exemplified embodiments of the invention are described. In the drawing.

DETAILED DESCRIPTION

Figure 1:
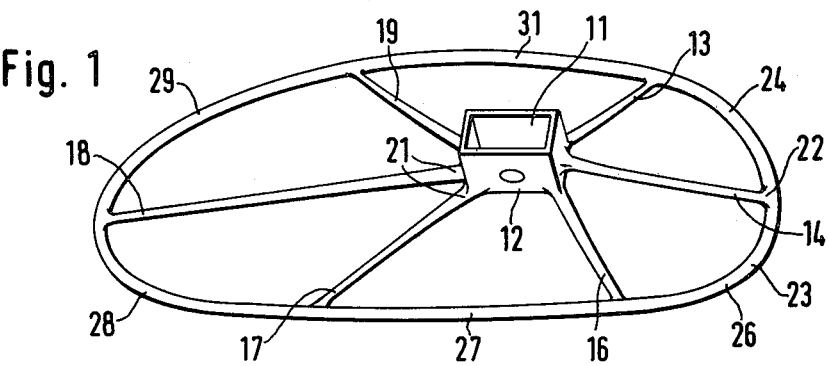
FIG. 1 shows, in a 6 x enlarged representation, the perspective view of receiver box, radiating members and edge.
Figure 2:
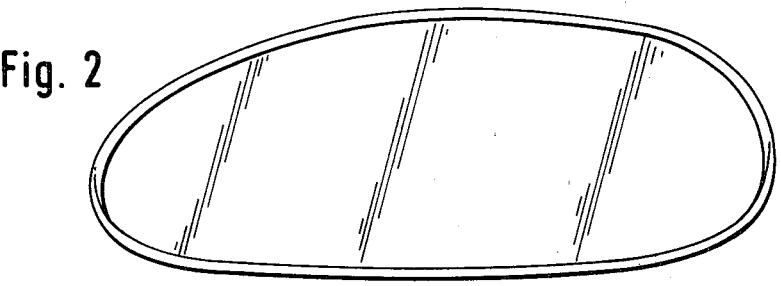
FIG. 2 shows the same view of a film fitting on the edge.

According to FIG. 1, radiating members 13, 14, 16, 17, 18 and 19 proceed from lower edge area 12 of a receiving box 11 of prior art design. As does the entire device according to FIG. 1, radiating members 13 to 19 consist of plastic material. Their cross section changes over their length. At their inner ends 21 they have the greatest width; after slightly tapering they essentially retain their cross-sectional dimension which at their outer ends 22 again increases. Outer ends 22 terminate in an edge 23 that follows the kidney-shaped periphery of such prior art pads. Rigid or stable receiving box 11 is situated in the gravity center of the so circumscribed area. According to FIG. 7, receiver box 11 is situated higher than is edge 23, causing radiating members 13 to 19 to descend from receiver box 11 to edge 23.

Figure 7:
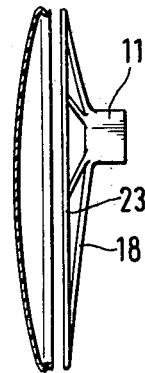
FIG. 7 shows the side view of FIG. 1.

The ascending angle of the radiating members, seen in the side view of FIG. 7, is approximately 5 to 15 degrees, preferably about 10 degrees. Radiating members 13 to 19 are essentially straight members. However, as FIG. 7 shows, to improve its progression member 18 may be slightly bent as it extends inward. The sum of the angles that include radiating members 13 to 19 is of course 360 degrees. The individual angular distances, however, are not necessarily equal to each other. Although the device is symmetrical with regard to the course of radiating members 14, 18, and radiating members 14, 18 align in the same manner as do radiating members 16, 19 on the one hand and 13, 17 on the other, radiating members 13, 14 assume an angle of 35°, which also applies for radiating members 14, 16. Radiating members 16, 17 however assume an angle of approximately 110° and radiating members 17, 18 from a top view form an angle of approximately 40°.

The result is that sections 24, 26, 27, 28, 29, 31 do not vary too greatly in length. At the same time it is assured that sections 28, 29 which have the greatest distance from receiver box 11 have the greatest elasticity, which is physiologically very favorable.

According to these configurations radiating members 13, 14, 16, 17, 19 are approximately equal in length, whereas member 18 by comparison with these is almost twice as long.

The entire part can be regarded as a type of snowshoe, but with the difference that the radiating members lie above the "snow surface."

Figure 3:
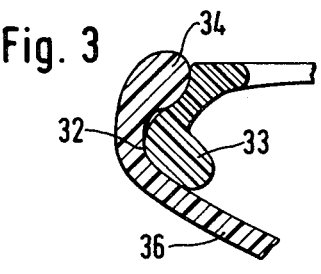
FIG. 3 shows a first option of connecting the outer region of the edge with the membrane edge.
Figure 4:
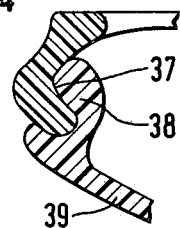
FIG. 4 shows a further exemplified embodiment compared to FIG. 3.

Edge 23, for example, may have a cross section as seen in FIG. 3 or FIG. 4.

Figure 5:
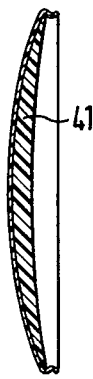
FIG. 5 shows a longitudinal section of a further exemplified embodiment of a film.
Figure 6:
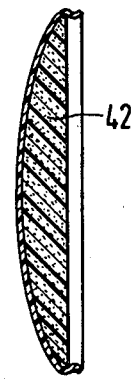
FIG. 6 shows a section similar to FIG. 5 for yet a further exemplified embodiment.

In the case of FIG. 3 it has an approximately S-shaped outer area 32, because of whose undercut design express reference is made to FIG. 3. The reason for the S-shaped design of outer area 32, together with rounded support ridge 33, is to permit a membrane edge 34 complementary in design to a membrane 36 of plastic to fit onto outer area 32 because of the undercut design of the latter and to be at the same time lightly braced by support ridge 33. The shape of membrane 36 is that of a shallow plate, as can be seen in FIGS. 5 to 7. Between it and radiating members 13 to 19 there is a volume that may be utilized in the manner still to be described.

FIG. 4 shows an outer area 37 of S-shaped design, but which in this case is provided on the inside of edge 33 (which otherwise was provided in the design according to FIG. 3) and which here serves as support for a membrane edge 38 of complementary design. Undercut areas are provided here as well. The difference from FIG. 3, however, is that membrane 39 has greater bending resistance than does membrane 36 which can be pulled onto edge 23 by stretching.

In the exemplified embodiment according to FIG. 4 the connection between membrane edge 38 and outer area 37 is of course based on pressure, and the prerequisite is that membrane 39 as it is self-supporting must be stiff whereas membrane 36—functioning only by stretching—need not have this property.

FIG. 5 shows that the membrane can be filled from the back with soft synthetic 41.

In the exemplified embodiment according to FIG. 6 the membrane is filled from the back with soft foam material 42.

Another option is to merely use the device—as is not illustrated here—according to FIG. 1 but with a pad of suitable, prior-art silicon rubber molded around it. The shape of the mold in the device according to FIG. 1 will then determine the outer surface design of the pad. In that case radiating members 13 to 19 and edge 23 should retain their naturally rough surfaces to allow better adherence of the silicon rubber to the surface.

I claim:

1. A pad of high elasticity for eyeglass frames having pad levers which attach the pads to the eyeglass frames, said pad having
   a thin, kidney-shaped outer edge portion,
   a soft, pliant front side, for contacting the eyeglass wearer,
   a back, and
   stable means on said back for receiving a pad lever, wherein the improvement comprises:
   thin, flexible members radiating integrally from said stable receiving means, having outer ends terminating at said kidney-shaped outer edge portion,
   a foil-like membrane having an outer edge portion and a convex surface according to the shape of the front contact side of the pad,
   said kidney-shaped outer edge portion having an outer area to receive said membrane and said membrane having a curved surface at its outer edge portion which engages with said outer area on said kidney-shaped outer edge portion.

2. Pad according to claim 1, in which said outer ends of said radiating members are enlarged.

3. Pad according to claim 1, in which said radiating members meet said receiving means at approximately the surface center of gravity of the pad.

4. Pad according to claim 1, in which the engagement of said outer area of said kidney-shaped outer edge portion and said membrane outer edge portion is a snap-on connection.

5. Pad according to claim 1, in which said radiating members and said kidney-shaped outer edge portion are molded of soft synthetic material and the surface of the soft synthetic material is molded to the contour of said membrane.

6. Pad according to claim 5, in which said the soft synthetic material has a Shore-D hardness, measured by DIN 53505, in the range of 5 to 15.

7. Pad according to claim 1, in which said radiating members, said kidney-shaped outer edge and said membrane consist of colorless material.

8. Pad according to claim 1, in which said membrane is a textile cover.

* * * * *